United States Patent
Tanaka et al.

[11] Patent Number: 6,046,788
[45] Date of Patent: Apr. 4, 2000

[54] LIQUID CRYSTAL DISPLAY DEVICE AND METHOD FOR DRIVING THE SAME

[75] Inventors: Tomio Tanaka, Tokyo; Tetsushi Yoshida, Kanagawa-ken; Manabu Takei, Sagamihara; Jun Ogura, Fussa, all of Japan

[73] Assignee: Casio Computer Co., Ltd., Tokyo, Japan

[21] Appl. No.: 09/073,636

[22] Filed: May 6, 1998

[30] Foreign Application Priority Data

May 8, 1997 [JP] Japan .................................. 9-132987

[51] Int. Cl.[7] ................................................ G02F 1/1337
[52] U.S. Cl. ........................................... 349/133; 349/174
[58] Field of Search ................................ 349/174, 133; 345/97

[56] References Cited

U.S. PATENT DOCUMENTS

| | | | |
|---|---|---|---|
| 5,078,477 | 1/1992 | Jono et al. | 349/174 |
| 5,719,653 | 2/1998 | Minato et al. | 349/174 |
| 5,784,140 | 7/1998 | Lee | 349/174 |
| 5,847,799 | 12/1998 | Tanaka et al. | 349/174 |

*Primary Examiner*—James A. Dudek
*Attorney, Agent, or Firm*—Frishauf, Holtz, Goodman, Langer & Chick, P.C.

[57] ABSTRACT

A liquid crystal material is sealed between substrates. The liquid crystal material exhibits an antiferroelectric phase while the liquid crystal is in a bulk state. In the liquid crystal layer sealed between the substrates, due to aligning forces of alignment films, liquid crystal molecules are aligned in a state wherein there is no correlation in molecular order between adjoining smectic layers, and the director of the liquid crystal layer is substantially coincident with the direction of a normal line of the smectic layers. The director varies continuously in accordance with the polarity and magnitude of a voltage applied between electrodes formed on the substrates. Arranging polarization plates so that the substrates are sandwiched therebetween enables a gradation to be displayed.

13 Claims, 15 Drawing Sheets

GATE SIGNAL

DATA SIGNAL

TRANSMITTANCE

LIQUID CRYSTAL DISPLAY DEVICE AND METHOD FOR DRIVING THE SAME

BACKGROUND OF THE INVENTION

1. Field of the Invention

The present invention relates to an LCD (Liquid Crystal Display) device using an AFLC (AntiFerroelectric Liquid Crystal) material, and more particularly to an LCD display device which is capable of performing gradation display and a method for driving the display device.

2. Description of the Related Art

A ferroelectric liquid crystal display device using an FLC (Ferroelectric Liquid Crystal) has received attention due to its quicker response and wider angle of visibility than those of a TN liquid crystal display device using a nematic liquid crystal.

Known FLC display devices include an FLC display device which uses an FLC and an AFLC display device which uses an AFLC.

An AFLC display device displays images through utilization of three stable alignment states which an AFLC has.

This matter will now be discussed in more detail. An AFLC has the first to third stable states in regard to the alignment of LC (Liquid Crystal) molecules; (1) according to the first and second stable states, when a voltage equal to or higher than a first threshold value is applied to an AFLC, the liquid crystal exhibits a first ferroelectric phase wherein the LC molecules are aligned in a first direction or a second ferroelectric phase wherein the LC molecules are aligned in a second direction, in accordance with the polarity of the applied voltage; and (2) according to the third stable alignment state, when a voltage equal to or lower than a second threshold value less than the first threshold value is applied to the AFLC, the liquid crystal exhibits an antiferroelectric phase which differs in the alignment of the LC molecules from the first and second ferroelectric phases. Determining the directions of the transmission axes of a pair of polarization plates arranged one on either side of an LCD device, on the basis of the optical axis of a liquid crystal layer while in the antiferroelectric phase, enables a display device to display images with controlling a light transmittance in accordance with the applied voltage.

Even when a variation occurs in the applied voltage, an AFLC stays in the first/second ferroelectric phase or the antiferroelectric phase, as far as the value of the applied voltage lies in a range between the first and second threshold values. This property is known as a memory property. A conventional AFLC display device is driven in a simple matrix mode through utilization of this memory property.

The memory property of an AFLC is determined by a difference between the magnitude of a voltage which causes a phase transition from the first/second ferroelectric phase to the antiferroelectric phase in the liquid crystal and a voltage which causes a phase transition from the antiferroelectric phase to the first/second ferroelectric phase in the liquid crystal. The greater difference between the magnitudes of those voltages, the more excellent memory property. In other words, the more remarkable hysteresis of the optical characteristic of the liquid crystal, the more excellent memory property.

Due to this, a conventional AFLC display device which is driven in a simple matrix mode uses, as an AFLC, such a liquid crystal that the difference between the magnitudes of the above-described voltages is large.

However, the light transmittance of the conventional AFLC display device, which uses an AFLC having an excellent memory property, can hardly be controlled arbitrarily. That is, the control of a display gradation is almost impossible and multi-gradation display cannot be realized.

SUMMARY OF THE INVENTION

It is accordingly an object of the present invention to provide an AFLC display device which can reliably display an image at the desired gradation.

According to the first aspect of the present invention having the above-described object, there is provided a liquid crystal display device comprising:

a first substrate on which pixel electrodes and active elements connected to the pixel electrodes are arranged in a matrix pattern;

a second substrate on which a common electrode is formed facing the pixel electrodes;

a liquid crystal layer formed by sealing, between the first and second substrates, an antiferroelectric liquid crystal which exhibits a chiral smectic phase while the liquid crystal is in a bulk state; and alignment films arranged each on one of opposite surfaces of the first and second substrates and having aligning forces by which liquid crystal molecules are aligned in a state in which there is substantially no correlation in molecular order between adjoining smectic layers in the liquid crystal layer, and by which a director of the liquid crystal layer is set substantially coincident with a direction of a normal line of the smectic layers; and means for changing the director of the liquid crystal layer by applying a voltage between the pixel electrodes and the common electrode.

According to the above-described structure, under the condition wherein no voltage is applied to the liquid crystal layer, the mean direction of the long axes of the liquid crystal molecules is substantially coincident with the direction of the normal line of the smectic layers, and the liquid crystal molecules are aligned so that there is no correlation in molecular order (a system of molecular arrangement) between the smectic layers, due to the interaction acting between each of the alignment films and the liquid crystal. When a voltage is applied to the liquid crystal layer, the liquid crystal molecules are oriented in a predetermined direction in accordance with the voltage as applied and its polarity. As the voltage applied to the liquid crystal layer is intensified/lowered gradually, the direction of the alignment of the liquid crystal molecules changes gradually such that the director of the liquid crystal layer varies continuously in accordance with the applied voltage. Depending on the arrangement of the polarization plates in the liquid crystal display device, an electro-optical characteristic wherein the relationship between the applied voltage and the transmittance describes a substantially V-shaped or S-shaped line in a graph and the range in which the optical characteristic changes linearly is wide, is attained without hysteresis. According to this electro-optical characteristic, the applied voltage determines the display gradation. Therefore, by applying a voltage corresponding to the desired gradation to the liquid crystal layer, an image is displayed at that gradation.

In order to permit the liquid crystal molecules to be aligned in the state wherein there is no correlation in molecular order between the smectic layers, it is preferred that the aligning forces which the alignment films have be stronger than intermolecular forces acting between the liquid crystal molecules.

Furthermore, it is preferred that the surface energy dispersion forces of the alignment films range from 30 to 50 dyn/cm and that the van der Waals forces of the alignment films range from 3 to 20 dyn/cm.

In the bulk state, the liquid crystal exhibits a chiral smectic CA phase having a double helical structure. When the liquid crystal is sealed between the first and second substrates, the double helical structure breaks, the liquid crystal molecules are aligned in the state in which there is no correlation in molecular order between the smectic layers, and the director is set substantially coincident with the direction of the normal line of the smectic layers. The director of the liquid crystal layer changes in accordance with a polarity and magnitude of the applied voltage. When a high voltage exceeding a predetermined value is applied to the liquid crystal layer, the liquid crystal layer exhibits a ferroelectric phase in accordance with a polarity of the applied high voltage.

The aforementioned means for changing the director includes driving means for controlling the director in order to perform gradation display, by applying a voltage to the liquid crystal layer in a manner of applying the voltage between each of the pixel electrodes and the common electrode through the active elements.

According to this structure, the liquid crystal molecules of the liquid crystal layer, while the driving means is applying a voltage to the liquid crystal layer, move in accordance with the polarity and magnitude of the applied voltage and along cones traced by molecules in a chiral smectic CA phase. Under this condition, the director of the liquid crystal layer varies continuously in accordance with the applied voltage. Due to this, the above-described liquid crystal display device is capable of displaying gradations.

It is preferred that the driving means move the director of the liquid crystal layer along the cone traced by a molecule in a chiral smectic CA phase, and through an angle smaller than the maximum value of the cone angle formed between the cone and the axis of the cone.

According to this structure, the gradation display is performed without setting the liquid crystal layer in a ferroelectric phase. Consequently, the display burning phenomenon is suppressed, and a high display screen contrast and a high image quality are attained.

According to the second aspect of the present invention, there is provided a liquid crystal display device comprising:

a first substrate on which first electrodes are formed;

a second substrate on which a second electrode is formed facing the first electrodes;

a liquid crystal layer formed by sealing, between the first and second substrates, an antiferroelectric liquid crystal which exhibits a chiral smectic phase while the liquid crystal is in a bulk state; and alignment films arranged each on one of opposite surfaces of the first and second substrates and having aligning forces by which liquid crystal molecules are aligned in a state in which there is no correlation in molecular order between adjoining smectic layers in the liquid crystal layer, and by which a director of the liquid crystal layer is set substantially coincident with a direction of a normal line of the smectic layers.

According to the above-described structure, under the condition wherein the liquid crystal molecules which exhibits a smectic phase are aligned in the state wherein there is no correlation in molecular order between the smectic layers, due to the interaction acting between each of the alignment films and the liquid crystal. When a voltage is applied to the liquid crystal layer, the liquid crystal molecules are aligned in one direction in accordance with the magnitude and polarity of the voltage as applied, due to the interaction of the electric field generated by the applied voltage with the spontaneous polarization which the liquid crystal has. As the voltage applied to the liquid crystal layer is intensified/lowered gradually, the direction of the alignment of the liquid crystal molecules changes gradually such that the director of the liquid crystal layer varies continuously in accordance with the applied voltage. Depending on the arrangement of the polarization plates in the liquid crystal display device, the applied voltage determines the direction of the director of the liquid crystal layer. Therefore, by controlling the voltage which is applied to the liquid crystal layer, the direction of the director can be controlled as desired.

It is preferred also in this liquid crystal display device that the aligning forces which the alignment films have are stronger than intermolecular forces acting between the liquid crystal molecules, in order to permit the liquid crystal molecules to be aligned in the state wherein there is no correlation in molecular order between the smectic layers.

The above-described liquid crystal display device further comprises driving means for controlling the director of the liquid crystal layer in order to perform gradation display, by applying a voltage to the liquid crystal layer.

According to this structure, the liquid crystal molecules move in accordance with the magnitude and polarity of the applied voltage and along the cones which molecules in a chiral smectic CA phase trace. Under this condition, the director of the liquid crystal layer varies continuously in accordance with the applied voltage. This enables the liquid crystal display device to achieve the gradation display.

It is preferred that the aforementioned driving means move the director of the liquid crystal layer along the cone traced by a molecule in a chiral smectic CA phase, and through an angle smaller than the maximum value of the cone angle formed between the cone and the axis of the cone, thereby to perform the gradation display without setting the liquid crystal layer in a ferroelectric phase.

According to this structure, the gradation display is performed without setting the liquid crystal layer in a ferroelectric phase. Consequently, the display burning phenomenon is suppressed, and a high display screen contrast and a high image quality are attained.

According to the third aspect of the present invention, there is provided a method for driving a liquid crystal display device, comprising steps of:

sealing, between first and second substrates, a liquid crystal layer formed of a liquid crystal material which exhibits a chiral smectic CA phase while the liquid crystal material is in a bulk state, liquid crystal molecules of the liquid crystal material being aligned in a state in which there is no correlation in molecular order between smectic layers in the liquid crystal layer and a director of the liquid crystal layer being set substantially coincident with a direction of a normal line of the smectic layers when the liquid crystal layer is sealed between the first and second substrates; and controlling the director of the liquid crystal layer in order to perform gradation display, by applying a voltage to the liquid crystal layer.

It is preferred that the director of the liquid crystal layer is moved along the cone traced by a molecule in a chiral smectic CA phase, and through an angle smaller than the maximum value of the cone angle formed between the cone and the axis of the cone, thereby to perform the gradation display without setting the liquid crystal layer in a ferroelectric phase.

According to the fourth aspect of the present invention, there is provided a method for displaying a gradation, comprising steps of:

forming a liquid crystal layer having a predetermined thickness by sealing, between first and second substrates, a liquid crystal material which exhibits a chiral smectic CA phase while the liquid crystal material is in a bulk state;

aligning liquid crystal molecules in a state in which there is no correlation in molecular order between adjoining smectic layers in the liquid crystal layer, and setting a director of the liquid crystal layer substantially coincident with a direction of a normal line of the smectic layers, through utilization of aligning forces of alignment films formed on inner surfaces of the first and second substrates;

controlling the director of the liquid crystal layer by applying a voltage to the liquid crystal layer; and displaying a gradation by detecting a change in the director with polarization means.

The phase the liquid crystal exhibits when sealed between the substrate, i.e., the phase in which the liquid crystal molecules in each smectic layer are aligned, but the smectic layers have no correlation with each other in the orientation of the liquid crystal molecules, is achieved by the interaction (surface effect) between each of the alignment films and the liquid crystal. The alignment films have aligning forces to align the liquid crystal molecules so that the smectic layers have no correlation with each other in the orientation of the liquid crystal molecules.

The above-described state of the alignment of the liquid crystal molecules is due to that the aligning forces of the alignment films, for example, are stronger than the intermolecular forces which act between the liquid crystal molecules so as to maintain the antiferroelectric molecular orientation, and that an energy gap between the ferroelectric and antiferroelectric phases is small.

BRIEF DESCRIPTION OF THE DRAWINGS

The file of this patent contains at least one drawing (photograph) executed in color. Copies of this patent with color drawing will be provided by the Patent and Trademark Office upon request and payment of the necessary fee.

DETAILED DESCRIPTION OF THE PREFERRED EMBODIMENTS

An LC display device according to one embodiment of the present invention and which can display halftone images will now be described with reference to the accompanying drawings.

Figure 1:
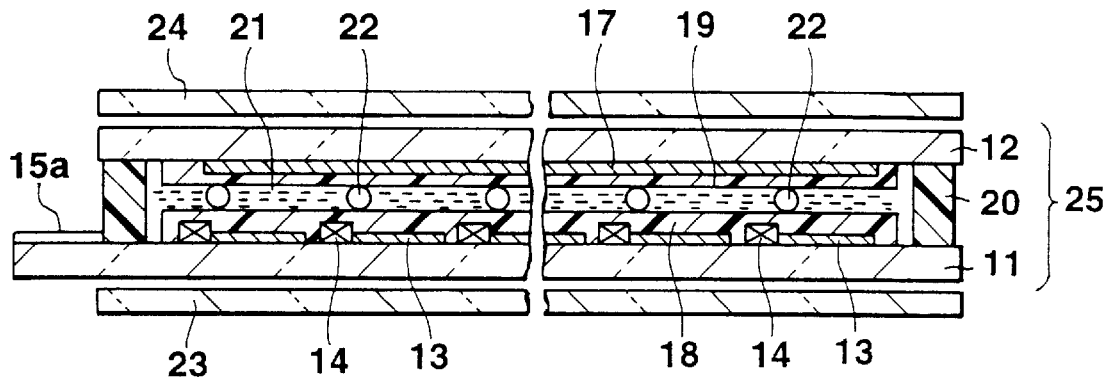
FIG. 1 is a diagram which illustrates a cross-sectional view showing the structure of a liquid crystal display device according to one embodiment of the present invention.

This LC display device is an active matrix type, and has a pair of transparent substrates (e.g., glass substrates) 11 and 12. In FIG. 1, transparent pixel electrodes 13 and active elements 14 connected thereto are arranged in a matrix pattern on the lower transparent substrate (hereinafter referred to as the lower substrate) 11.

The active elements 14 are formed of thin film transistors (hereinafter referred to as the TFTs 14), for example. Each of the TFTs 14 has a gate electrode formed on the lower substrate 11, a gate insulating film covering the gate electrode, a semiconductor layer formed on the gate insulating film, a source electrode formed on the semiconductor layer, and a drain electrode.

Figure 2:
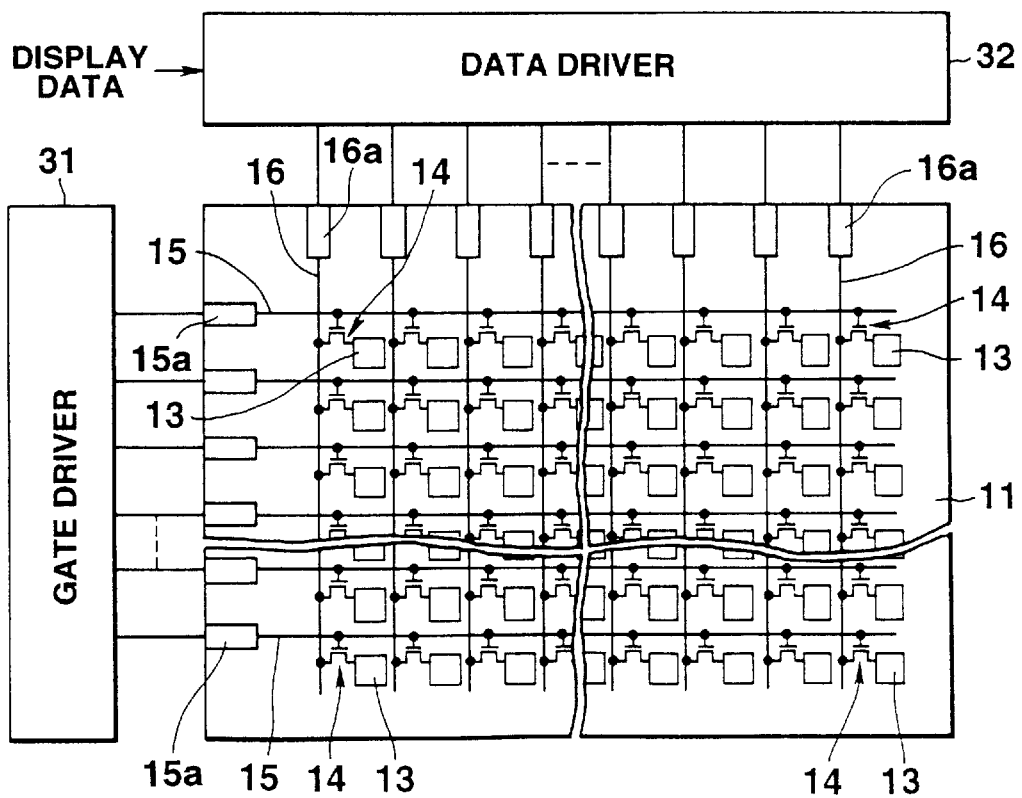
FIG. 2 is a diagram which illustrates a plan view showing the structure of the lower substrate of the liquid crystal display device illustrated in FIG. 1.

As illustrated in FIG. 2, gate lines (scanning lines) 15 are arranged between the rows of pixel electrodes 13, while data lines (gradation signal lines) 16 are arranged between the columns of pixel electrodes 13. The gate electrodes of the individual TFTs 14 are connected to their corresponding gate lines 15, and the drain electrodes of the TFTs 14 are connected to their corresponding data lines 16.

End portions 15a of the gate lines 15 are connected to a gate driver 31, and end portions 16a of the data lines 16 are connected to a data driver 32. The gate driver 31 applies a gate signal (which will be described later) to the gate lines 15 in order to scan the gate lines 15. The data driver 32 receives display data (gradation data) and applies a data signal corresponding to the display data to the data lines 16.

The gate lines 15 are covered with the gate insulating film (transparent film) of the TFTs 14, except their end portions 15*a*. The data lines 16 are formed on this gate insulating film. The pixel electrodes 13 are made of ITO or the like, and are formed on the gate insulating film. Each pixel electrode 13 is connected at its one end portion to the source electrode of a corresponding one of the TFTs 14.

In FIG. 1, a transparent common electrode 17, which faces the individual pixel electrodes 13 of the lower substrate 11, is formed on the upper transparent substrate (hereinafter referred to as the upper substrate) 12. The common electrode 17 is made of ITO or the like and is comprised of a single electrode extending over the entire display area. A reference voltage is applied to the common electrode 17. The pixel electrodes 13 and the common electrode 17 apply a voltage to an LC layer 21 sandwiched therebetween, thereby controlling the alignment direction of the LC molecules so that the director (the mean direction of the long axes) of the LC molecules varies continuously. By so doing, the optical axis of the LC layer is continuously controlled so as to control a display gradation.

Alignment films 18 and 19 are arranged one on each of those surfaces of the lower and upper substrates 11 and 12 on which the electrodes are formed.

The alignment films 18 and 19 are homogeneous alignment films which have undergone the alignment treatment of being rubbed in the same direction (the third direction 21C shown in FIG. 3 and which will be discussed later). The alignment films 18 and 19 have the aligning forces by which the LC molecules are aligned substantially in the direction 21C of the alignment treatment.

The alignment films 18 and 19, which have undergone the alignment treatment such as rubbing, are formed of an organic high molecular compound such as polyimide, and are approximately 25 nm to 35 nm in thickness.

The lower substrate 11 and the upper substrate 12 are adhered to each other at their peripheral edge portions via a frame-shaped seal member 20. An LC cell 25 is formed by sealing the LC layer 21 in a region surrounded by the seal member 20 between the substrates 11 and 12. The thickness of the LC layer 21 is equal to or less than the natural pitch of the liquid crystal, and is set at approximately 1.5 microns. The thickness of the LC layer 21 is restricted by transparent spacers 22 which are arranged here and there in the region in which the LC layer 21 is sealed.

The LC layer 21 is formed of such an LC material that (1) the LC material while in the bulk state exhibits a chiral smectic CA (SmCA*) phase; (2) the LC material, when sealed between the substrates 11 and 12, exhibits a phase wherein LC molecules are aligned in each (smectic) layer of the layer structure of a smectic LC and the director is substantially coincident with the direction of a line normal to the smectic layers, while there is no correlation in molecular order between the smectic layers; (3) when a voltage having a low or intermediate level is applied to the LC material, the LC molecules are gradually aligned in one direction in accordance with the polarity and intensity of the applied voltage; and (4) when a satisfactorily high voltage is applied to the LC material, the LC material exhibits a ferroelectric phase in which the LC molecules are aligned substantially in the first direction 21A or second direction 21B shown in FIG. 3.

The details of the LC layer 21 will be discussed later.

A pair of polarization plates 23 and 24 are arranged at the bottom and top of the LCD device. As shown in FIG. 3, the optical axis (hereinafter referred to as the transmission axis) 23A of the lower polarization plate 23 is set substantially parallel to a line normal to the smectic layers. The direction of the normal line is substantially coincident with the third direction 21C. The optical axis (transmission axis) 24A of the upper polarization plate 24 is set substantially perpendicular to the transmission axis 23A of the lower polarization plate 23.

Figure 3:
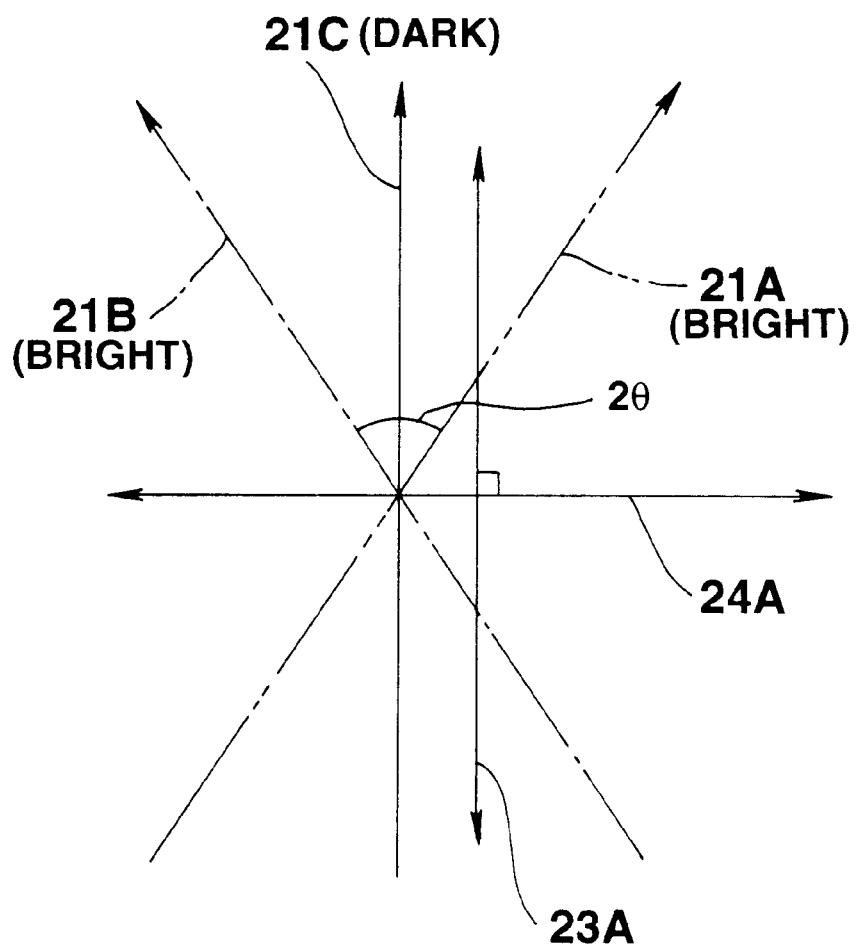
FIG. 3 is a diagram showing one example of the relationship between the transmission axes of polarization plates and the alignment direction of liquid crystal molecules.

The transmittance of the AFLC display device, whose polarization plates 23 and 24 have the transmission axes 23A and 24A set as shown in FIG. 3, becomes almost maximum (the display becomes brightest) when the director of the LC layer 21 represents substantially the first alignment direction 21A or the second alignment direction 21B. The transmittance becomes almost minimum (the display becomes darkest) when the director of the LC layer 21 represents substantially the third direction 21C.

More specifically, under the condition wherein the LC molecules are aligned in the first direction 21A or the second direction 21B, a change occurs in the polarization state of the linearly polarized light which has passed through the light incident-side polarization plate 23 in parallel with the transmission axis 23A, due to the birefringence effect of the LC layer 21, and the light whose polarization state has thus changed enters the light outgoing-side polarization plate 24. A component of the light which is parallel to the transmission axis 24A passes through the light outgoing-side polarization plate 24, and the display becomes bright as a result. Under the condition wherein the director represents the third direction 21C, the linearly polarized light which has passed through the light incident-side polarization plate 23 in parallel with the transmission axis 23A is hardly susceptible to the birefringence effect of the LC layer 21. The linearly polarized light which has passed through the light incident-side polarization plate 23 passes as is through the LC layer 21, and is mostly absorbed by the light outgoing-side polarization plate 24, with the result that the display becomes dark.

When the LC layer 21 is optically in an intermediate state, the gradation according to the direction of the director is attained.

The alignment films 18 and 19 and the LC layer 21 will now be described in more detail.

The LC layer 21 is formed of a liquid crystal whose main component is, for example, a liquid crystal composition having the skeleton expressed in Chemical Formula 1. This liquid crystal has the properties shown in Table 1.

[Chemical Formula 1]

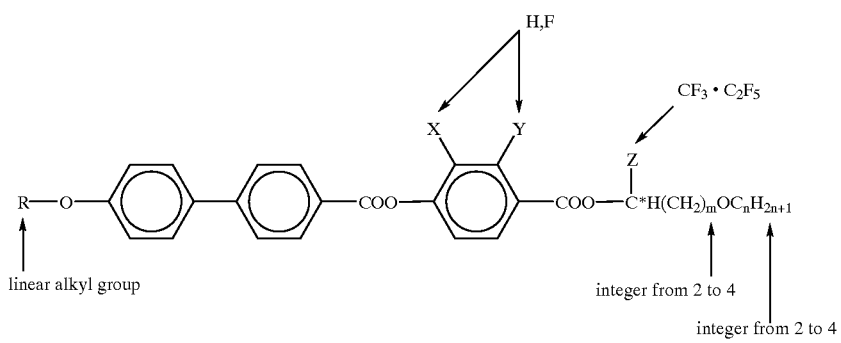

TABLE 1

| Phase transition sequence | Crystal −30° C. − SmCA* − 69° C. − SmA − 80° C. − ISO |
|---|---|
| Spontaneous polarization | 229 nC/cm$^2$ |
| Cone angle | θ32 degrees |
| Helical pitch | 1.5 microns |

The aforementioned cone angle is the angle which a cone traced by an LC molecule forms with the axis of the cone, and the first direction 21A and the second direction 21B form an angle of 2θ which is two times as large as the cone angle θ.

Figure 4:
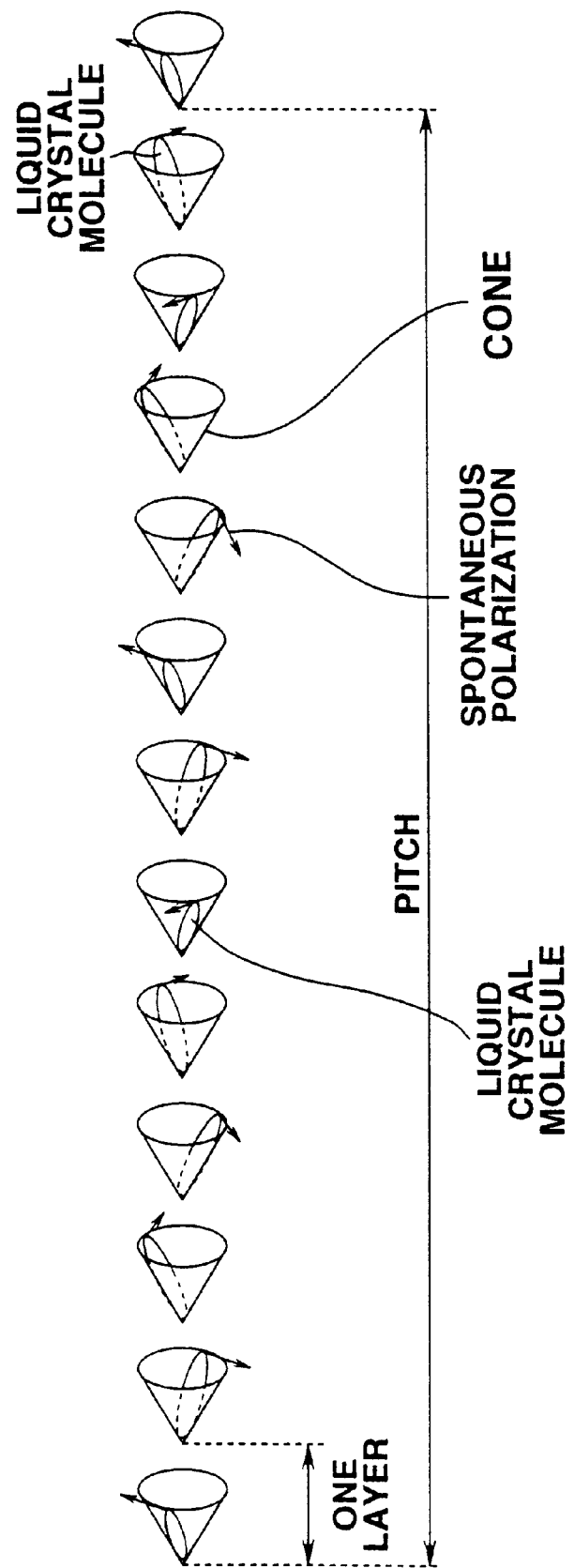
FIG. 4 is a diagram for explaining the double helical structure traced by liquid crystal molecules in a bulk state.

In the bulk state, the LC material comprises layers which are formed of aligned molecules, and has a helical structure as shown in FIG. 4. Adjoining LC molecules in each layer have such a double helical structure that they trace helixes shifted approximately 180 degrees on imaginary cones. The spontaneous polarizations of the LC molecules in adjoining smectic layers cancel out each other.

When the LC material is sealed in the LC cell 25, the double helical structure vanishes due to the thickness (cell gap) of the LC layer 21 being nearly equal to 1 pitch (natural pitch) of the helical structure of the LC material (the thickness of the LC layer 21 is 1.5 microns).

Features of the liquid crystal having the above structure and properties reside in that a gap between the potential energy of the liquid crystal while in an antiferroelectric phase and the potential energy of the liquid crystal while in a ferroelectric phase is small, and that the antiferroelectric order is more liable to disorder and the pretransitional phenomena are more remarkable than in the case of a normal antiferroelectric liquid crystal. The "pretransitional phenomena" indicate such phenomena that when the electric field, which is applied to the molecules of the liquid crystal in the antiferroelectric phase, is intensified gradually, the transmittance of an LCD device employing the optical arrangement shown in FIG. 3 becomes high before a transition from the antiferroelectric phase to the ferroelectric phase occurs. An increase in the transmittance suggests that the LC molecules behave before the occurrence of the phase transition, and which in turn suggests that the gap between the potential energy of the liquid crystal while in the antiferroelectric phase and the potential energy of the liquid crystal while in the ferroelectric phase is minor.

Such a liquid crystal, when sealed in the LC cell 25, is susceptible to the interactions (surface effect) occurring at the interfaces between the liquid crystal and the alignment films 18 and 19, in other words, the alignment forces resulting from the alignment treatment. Due to the relationship between the alignment forces and the intermolecular forces of the LC layer 21, the LC molecules cannot become the ferroelectric or antiferroelectric phase, and enters the state wherein there is no energetic superiority in the directions of electric dipoles. That is, the liquid crystal exhibits a phase wherein the LC molecules are aligned substantially in the same direction in each (smectic) layer of the layer structure of a smectic LC and accordingly the director is substantially coincident with the direction of the normal line of the smectic layers, but there is substantially no correlation in molecular order between adjoining layers.

Figure 5:
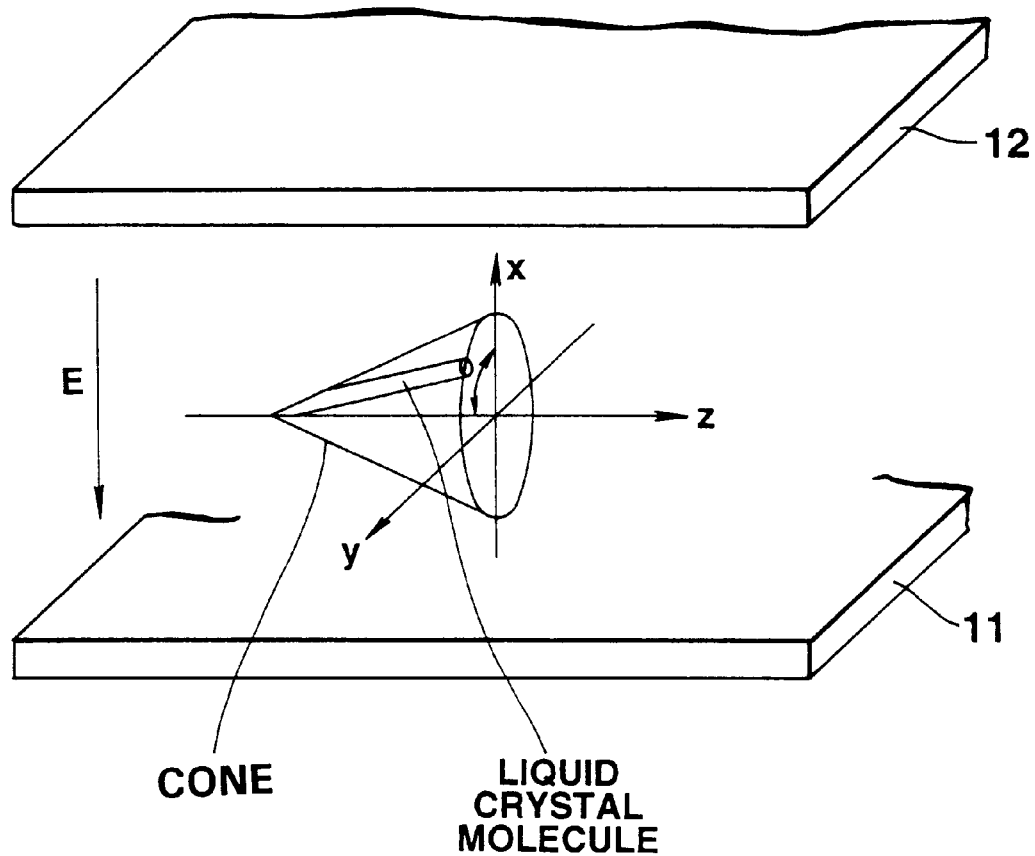
FIG. 5 is a diagram for explaining the alignment state of the liquid crystal molecules sealed between substrates.

In this phase, the LC molecules are able to easily move along imaginary cones as shown in FIG. 5, and some LC molecules are aligned with being tilted with respect to the major surfaces of the substrates.

Figure 6:
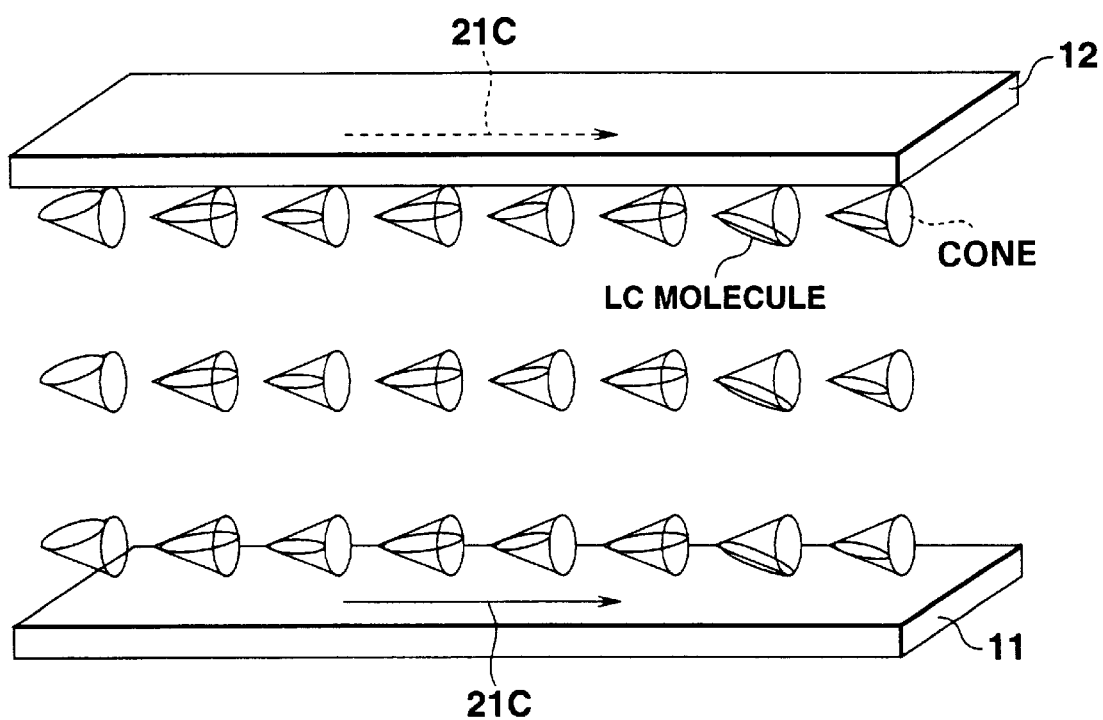
FIG. 6 is a diagram for explaining the alignment state of the liquid crystal molecules.
Figure 7:
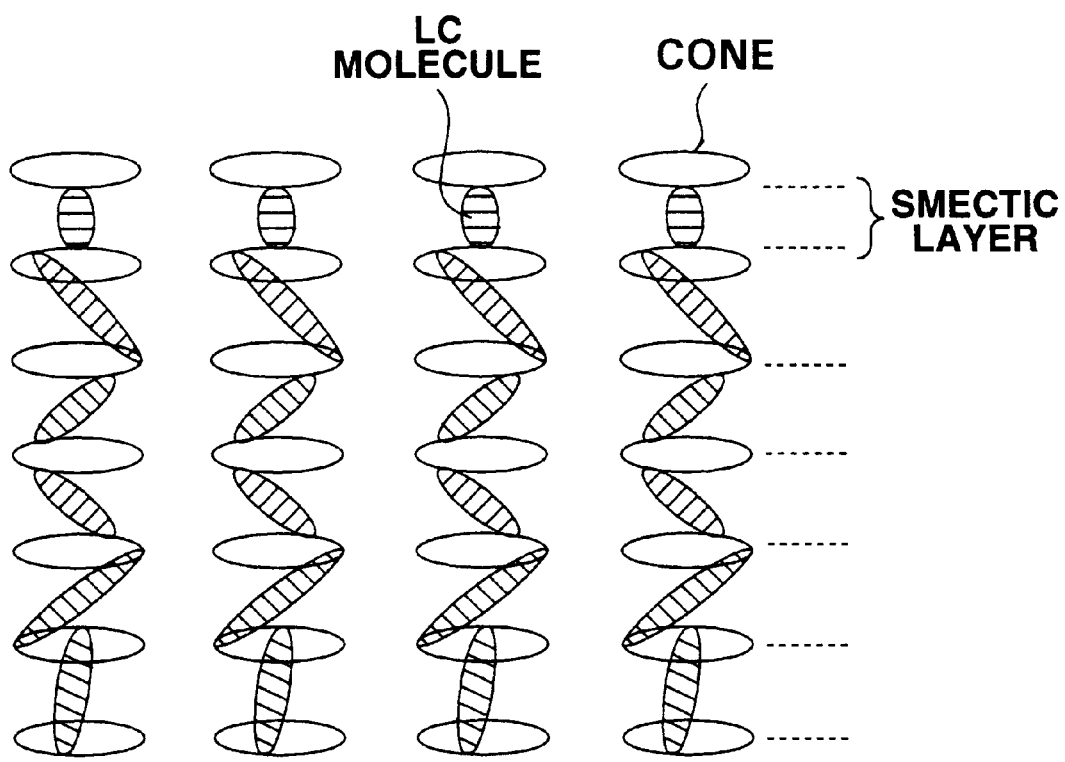
FIG. 7 is a diagram for explaining the alignment state of the liquid crystal molecules.

The models of the LC molecules thus aligned are illustrated in FIGS. 6 and 7.

When a voltage is applied to the LC layer 21, the LC molecules behave as shown in FIG. 5, along imaginary cones traced by molecules in the smectic CA* phase, due to the interaction between the applied voltage and the electric dipoles of the LC molecules, and the LC molecules are aligned in the first direction 21A or the second direction 21B.

When a satisfactorily high voltage having a positive polarity (which is equal to or greater than a saturation voltage) is applied to the LC layer 21, the liquid crystal exhibits the first ferroelectric phase in which the LC molecules are aligned substantially in the first direction 21A. Under this condition, the spontaneous polarizations of the LC molecules are directed in almost the same direction.

When a satisfactorily high voltage having a positive polarity (which is equal to lower than the saturation voltage) is applied to the LC layer 21, the liquid crystal exhibits the second ferroelectric phase in which the LC molecules are aligned substantially in the second direction 21 B. Under this condition, the spontaneous polarizations of the LC molecules are directed in almost the same direction.

In those ferroelectric phases, the optical axis of the LC layer 21 substantially coincides with the first direction 21A or the second direction 21B.

Figure 8:
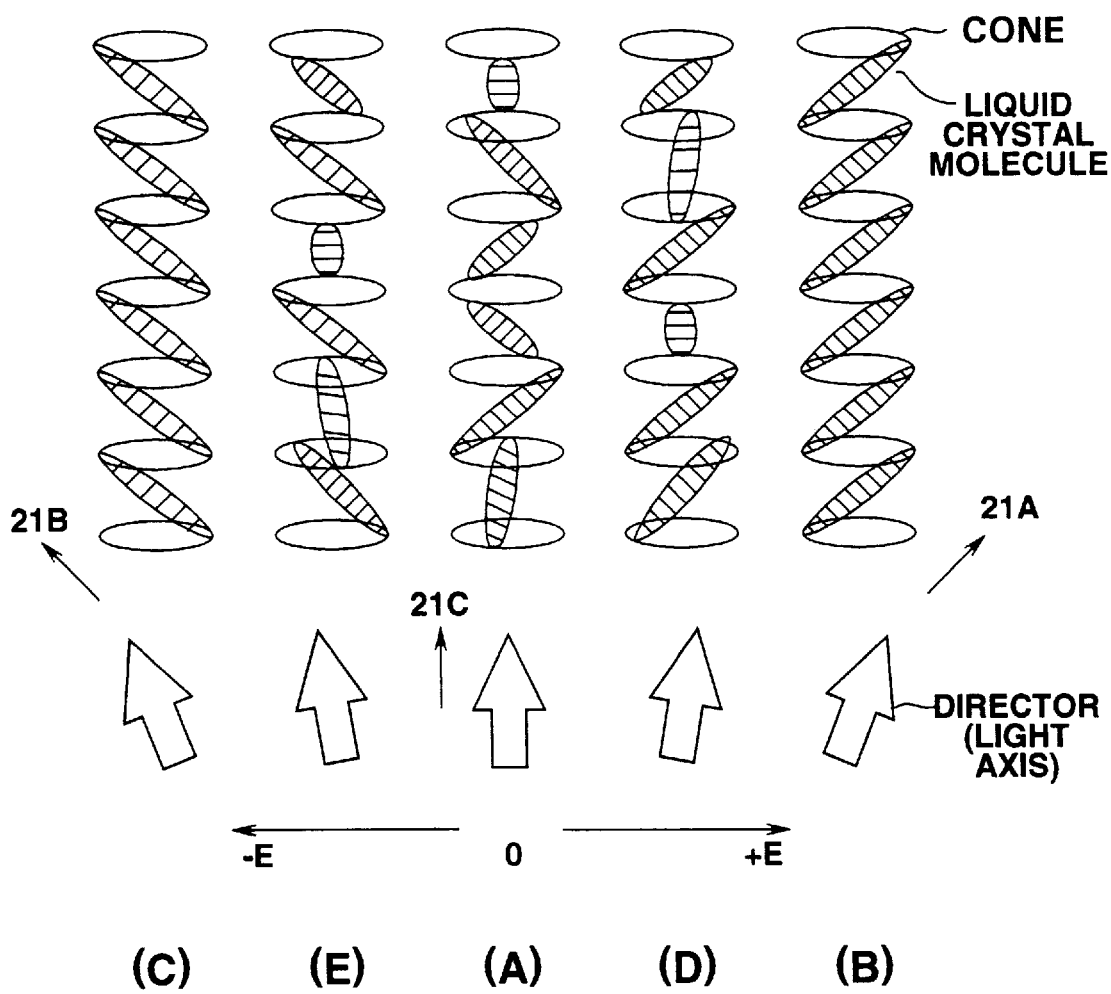
FIGS. 8A to 8E are diagrams showing the relationship between the applied voltage and the alignment of the liquid crystal molecules.

In the LC layer 21 while applied with no voltage, the LC molecules extend in various directions, and the director (mean alignment direction) of the LC molecules represents nearly the direction 21 C of the alignment treatment, as shown in FIG. 8A.

When a satisfactorily high voltage is applied to the LC layer 21, the LC molecules are aligned in the first direction 21A or the second direction 21B, and the director represents the first direction 21A or the second direction 21B, as shown in FIG. 8B or 8C.

When an intermediate voltage is applied to the LC layer 21, the LC molecules are tilted in the first direction 21A or the second direction 21B in accordance with the applied voltage, as shown in FIGS. 8D and 8E, and the director continuously varies between the normal line direction 21C of a smectic layer and the first direction 21A, and between the normal line direction 21C and the second direction 21B, in accordance with the polarity of the applied voltage.

The optical characteristic of this LCD device, when shown in a graph, does not trace a horizontal line in the vicinity of an applied voltage of 0V, and varies smoothly in accordance with increases in the absolute value of the applied voltage. The optical characteristic which the LCD device exhibits when applied with positive voltages and that which the LCD device exhibits when applied with negative voltages are symmetrical. When a voltage whose absolute value is equal to or greater than that of the saturation voltage is applied to the LC layer, the transmittance becomes saturated.

Figure 9A:
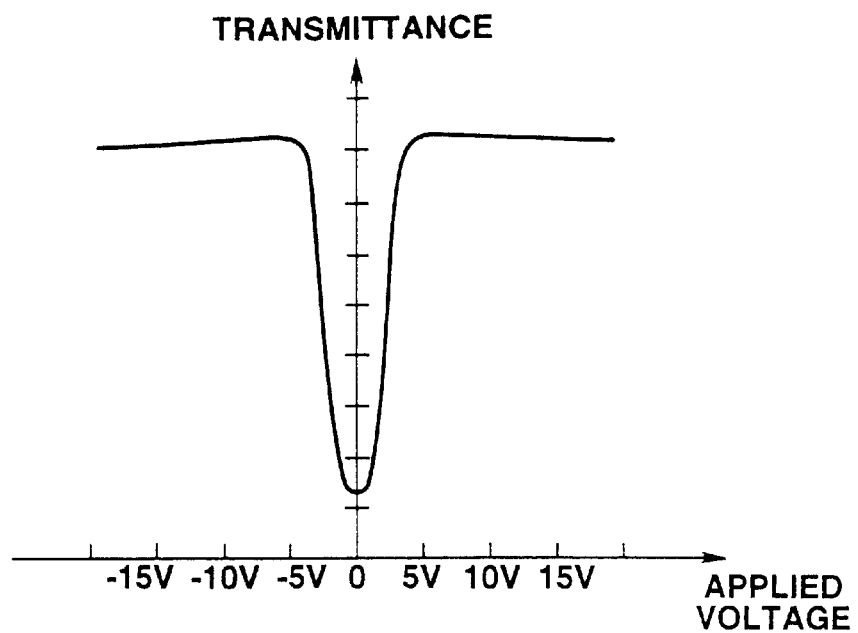
FIG. 9A is a graph showing the relationship between the applied voltage and the transmittance when a low frequency voltage having a rectangular waveform is applied to the liquid crystal display device of Example 1 (according to the present invention) which employs the optical arrangement illustrated in FIG. 3.

FIG. 9A exemplifies the relationship between the transmittance and the rectangular-waveform voltage applied to the LC layer included in the LCD device of this embodiment (Example 1).

The LC layer 21 of the LCD device of Example 1 according to the present invention is formed of a liquid crystal whose main component is a liquid crystal composition which has been attained by processing the liquid crystal composition having the skeleton expressed in Chemical Formula 1 and having the properties shown in Table 1. The LC layer 21 is sealed between the upper and lower substrates, with the cell gap being set at 1.5 microns and in the state wherein the helical structure traced by the LC molecules has been broken.

The alignment films 18 and 19 employed in the above LCD device are those which are formed of an organic high molecular compound such as polyimide and which have been subjected to rubbing.

Figure 9B:
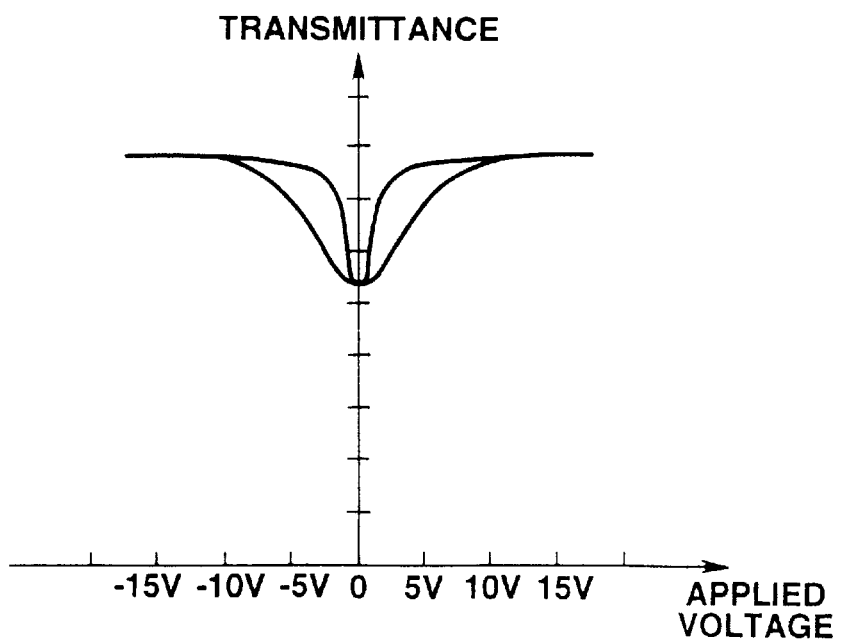
FIG. 9B is a graph showing the relationship between the applied voltage and the transmittance in Comparative Example 1 wherein a gap length is 5 microns.

FIG. 9B shows the relationship between the transmittance and the voltage applied to the LC layer included in an LCD device (Comparative Example 1). The LC layer of this LCD device is sealed with the cell gap being set at 5 microns and in the state wherein the helical structure traced by the LC molecules is maintained.

As seen from FIG. 9A, the applied voltage versus transmittance characteristic of the LCD device of Example 1 according to the present invention does not have a definite threshold value, the transmittance varies continuously, the characteristic is symmetrical with respect to the polarity of the applied voltage, the hysteresis is very minor, and the contrast (a difference between the minimum transmittance and the maximum transmittance) is high. Applied voltages and transmittances are substantially in one-to-one correspondence with each other. This permits halftones to be reliably displayed, and enables high-contrast display images to be attained.

In contrast, the applied voltage versus transmittance characteristic of the LCD device in Comparative Example 1 has a threshold value, the hysteresis is remarkable, and the applied voltage versus transmittance characteristic is not smooth, as seen from FIG. 9B. Moreover, the contrast is low.

Figure 10:
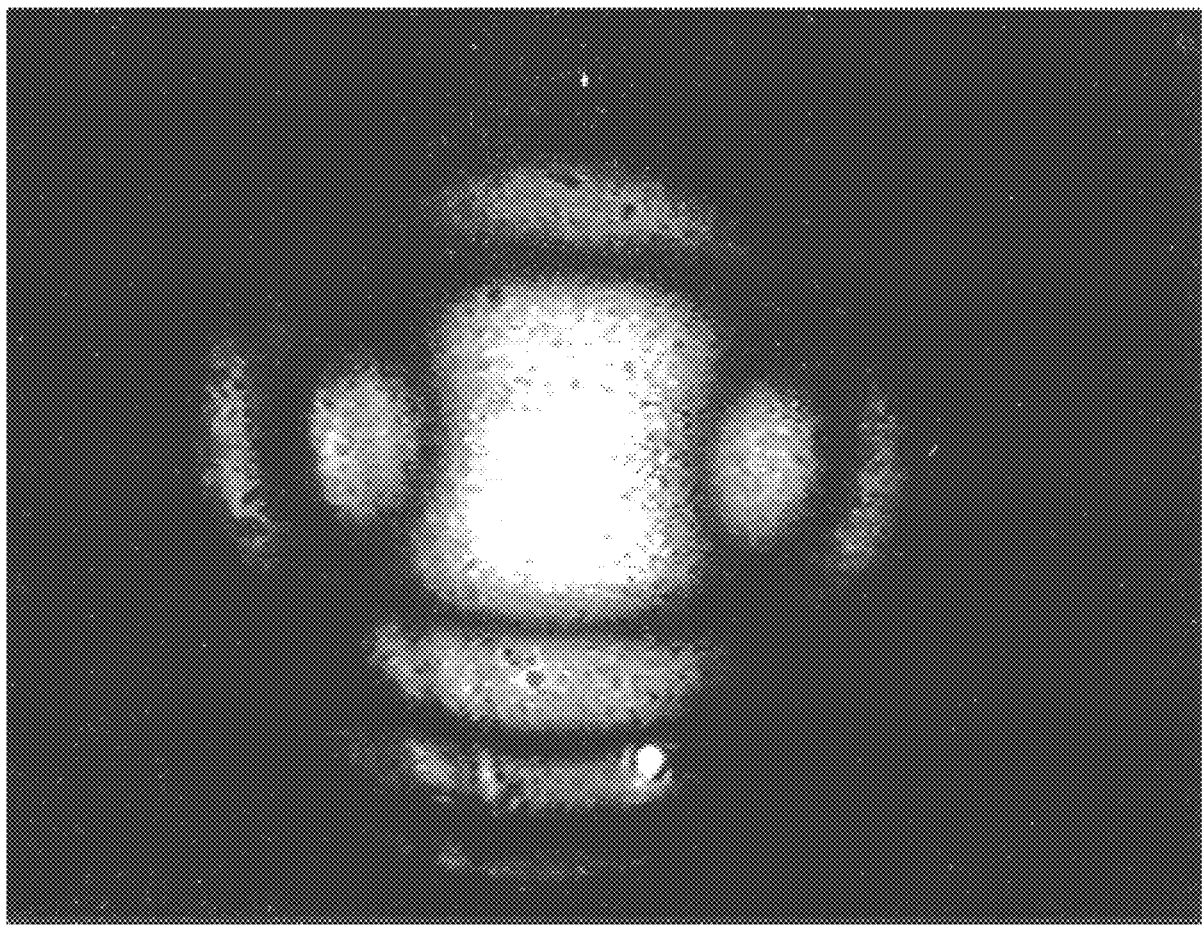
FIG. 10 is a photograph showing the conoscope image of the liquid crystal while in the bulk state.

FIG. 10 shows the conoscope image of the LC material while in the bulk state. The conoscope image shown in FIG. 10 is one taken viewing the LC material in the direction of the normal line of the smectic layers. In FIG. 10, two melanopes (bright spots) appear along an imaginary line which is nearly perpendicular to the arrow representing electric field E and which passes through the center of concentric isogyros (bright and dark rings), and are symmetric with respect to an imaginary line which is nearly parallel with the arrow of electric field E and which passes through the aforementioned center. These matters suggest that the LC molecules are in the antiferroelectric phase wherein the LC molecules trace the double helical structure. In the LCD device of this embodiment, as described previously, the LC layer 21 assumes the alignment state wherein there is no correlation in molecular order between the smectic layers. When an electric field is applied to the LC layer 21 and is intensified/lowered gradually, the direction of the director varies continuously between the first direction 21A and the second direction 21B in accordance with the applied voltage. This permits an image to be displayed reliably at the desired gradation.

In FIG. 3, the transmission axis 23A of the lower polarization plate 23 is arranged nearly parallel with the normal line of the smectic layers included in the LC layer 21, while the transmission axis 24A of the upper polarization plate 24 is arranged perpendicular to the transmission axis 23A. However, the arrangements of the transmission axes 23A and 24A of the lower and upper polarization plates 23 and 24 are arbitrary according to the electro-optical characteristic of the required LCD device.

Figure 11A:
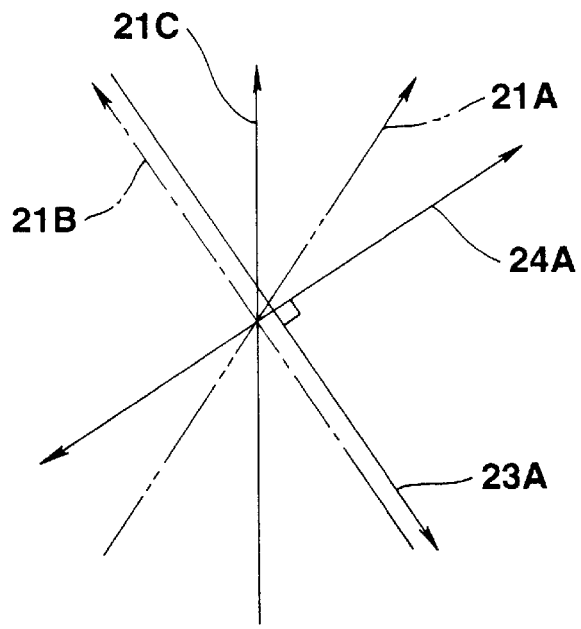
FIGS. 11A and 11B are diagrams showing other examples of the relationship between the transmission axes of the polarization plates and the alignment direction of the liquid crystal molecules.

For example, in the case of employing an LC material whose cone angle $\theta$ is on the order of 22.5 degrees, the transmission axis 23A of the lower polarization plate 23 can be arranged parallel with the second direction 21B, and the transmission axis 24A of the upper polarization plate 24 can be arranged perpendicular to the transmission axis 23A of the lower polarization plate 23, as illustrated in FIG. 11A. According to this structure, when a satisfactorily high voltage having a negative polarity (which is equal to or greater than the threshold value) is applied to the LC layer 21, the director represents the second direction 21B such that the display becomes darkest. On the other hand, when a satisfactorily high voltage having a positive polarity (which is equal to or greater than the threshold value) is applied to the LC layer 21, the director represents the first direction 21A such that the display becomes brightest.

Figure 11B:
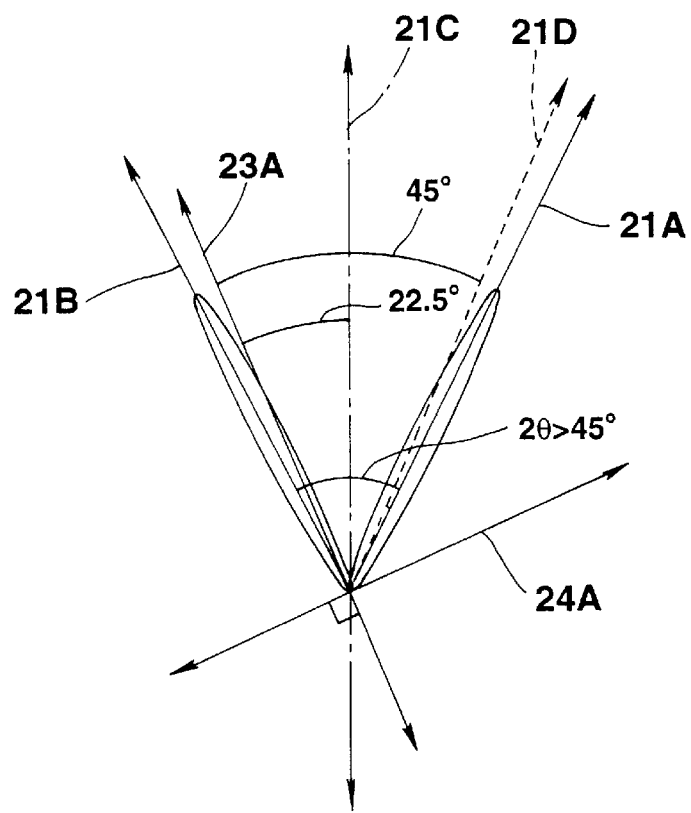

In the case of employing an LC material whose cone angle $\theta$ is grater than 22.5 degrees, the transmission axis of one polarization plate (the lower polarization plate 23 or the upper polarization plate 24) may be arranged so as to form an angle of 22.5 degrees with the normal line of the smectic layers of the LC layer 21; the second direction 21B, which serves as the director when the LC layer exhibits a ferroelectric phase, may be set so that an angle larger than 22.5 degrees but is smaller than the cone angle $\theta$ is formed between the second direction 21B and the normal line of the smectic layers of the LC layer 21; and the transmission axis of the other polarization plate may be arranged substantially perpendicular to the transmission axis of the aforementioned one polarization plate, as illustrated in FIG. 11B. Employing this optical arrangement, the liquid crystal can be driven without exhibiting the ferroelectric phase. Therefore, the display burning phenomenon, etc. can be prevented from occurring, and the flicker can be suppressed.

For example, in the case of adopting an LC material whose cone angle is 32 degrees as shown in Chemical Formula 1, the transmission axis 23A of the lower polarization plate 23 is arranged so as to form an angle of, for example, 22.5 degrees with the normal line of the smectic layers of the LC layer 21 (the direction of the normal line is substantially coincident with the direction 21C), as illustrated in FIG. 11B. Moreover, the transmission axis 24A of the upper polarization plate 24 is arranged substantially perpendicular to the transmission axis 23A.

The amount of transmission light is controlled by applying between opposite electrodes a voltage lower than such a voltage as would cause the LC layer, formed of the above-described liquid crystal, to exhibit the ferroelectric phase, so that the director of the LC layer varies in a range defined between the direction (23A) which forms an angle of 22.5 degrees with the normal line of the smectic layers and the direction (21D) which forms an angle of 22.5 degrees with the normal line of the smectic layers (the direction of the normal line is substantially coincident with the direction 21C).

According to the above structure, the display becomes darkest when the director represents the direction of the transmission axis 23A, and the display becomes brightest when the director represents the direction 21D which forms an angle of 45 degrees with the transmission axis 23A. In this case, the gradation display can be achieved without changing the director until the director becomes coincident with the first direction 21A and the second direction 21B in order to attain the minimum to maximum gradations. In short, the liquid crystal can be driven without setting it in a ferroelectric phase.

Even in the case where the above-described optical arrangement is employed, the relationship between the applied voltage and the behavior, phase transition, etc. of the molecules within the LC layer 21 is as discussed previously, and the direction of the director varies continuously between the first direction 21A and the second direction 21B. This permits an image to be displayed at the desired gradation. Furthermore, the flicker is reduced as compared to the case of the optical arrangement illustrated in FIG. 3, and the liquid crystal layer 21 is not set in the ferroelectric phase. Therefore, the display burning phenomenon is suppressed, and high-contrast display images of an excellent quality are attained.

Figure 12A:
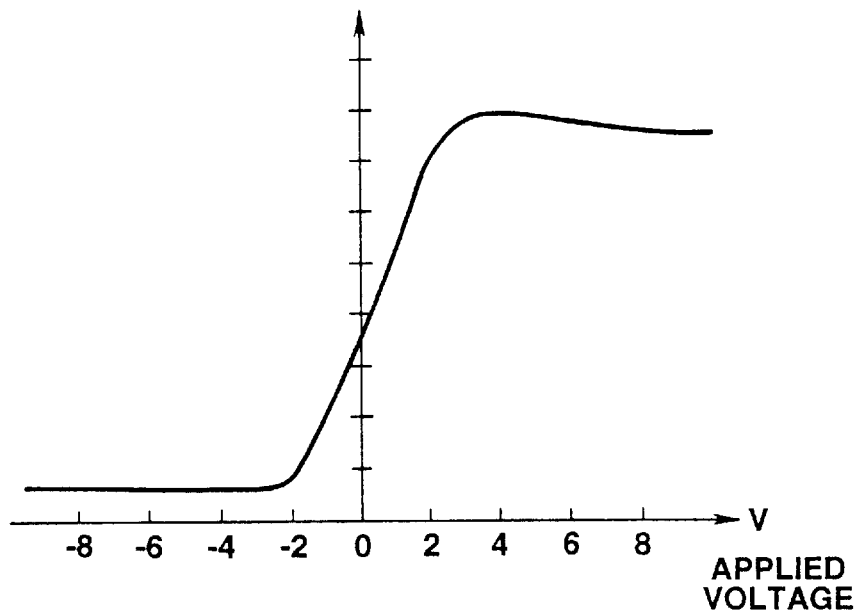
FIG. 12A is a graph showing the relationship between the applied voltage and the transmittance when a low frequency voltage having a rectangular waveform is applied to the liquid crystal display device of Example 2 (according to the present invention) which employs the optical arrangement illustrated in FIG. 11B.

FIG. 12A shows the applied voltage versus transmittance characteristic of the LCD device (Example 2 according to the present invention). In this LCD device, the optical arrangement illustrated in FIG. 11B is applied to the above-described LC cell (in which a liquid crystal, having the properties shown in Table 1 and containing as the main component a liquid crystal composition having the skeleton expressed in Chemical Formula 1, is sealed with the cell gap being set at 1.5 microns).

Figure 12B:
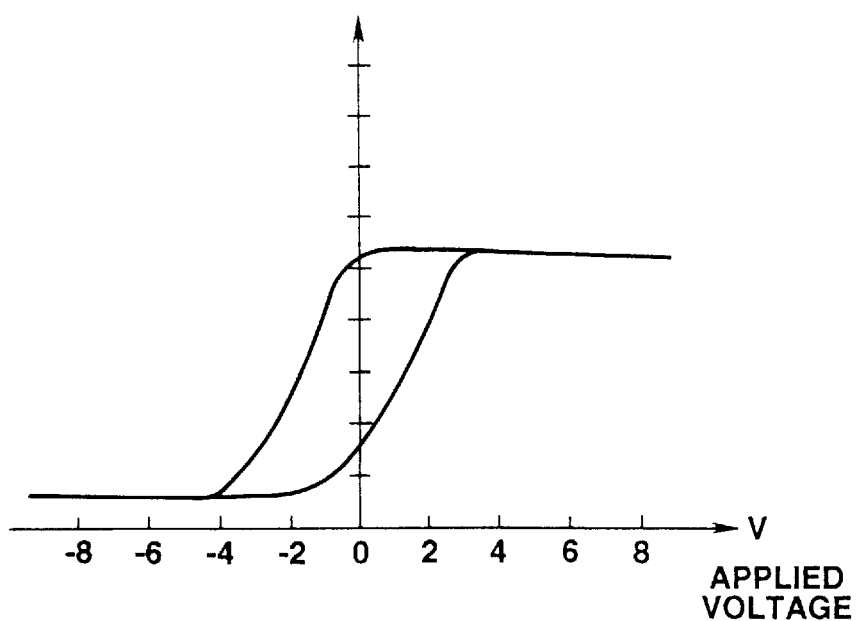
FIG. 12B is a graph showing the relationship between the applied voltage and the transmittance in Comparative Example 2 wherein the gap length is 5 microns.

FIG. 12B shows the applied voltage versus transmittance characteristic of an LCD device (Comparative Example 2) which is identical in structure with that of Example 2 according to the present invention, except that the cell gap is 5 microns.

The characteristics shown in FIGS. 12A and 12B are those obtained by applying a rectangular-waveform voltage between the electrodes 13 and the electrode 17 facing the electrodes 13.

As seen from FIG. 12A, the applied voltage versus transmittance characteristic of the LCD device of Example 2 according to the present invention does not have a definite threshold value, the transmittance varies continuously, and the characteristic is symmetrical with respect to the polarity of the applied voltage, the hysteresis is minor, and the contrast is high. On the other hand, in the case of Comparative Example 2, the applied voltage versus transmittance characteristic has a threshold value, the hysteresis is considerable, and the applied voltage versus transmittance characteristic is not smooth, as seen from FIG. 12. Moreover, the contrast is low.

It can be ascertained also from FIGS. 12A and 12B that the LCD device of the present invention has an excellent display ability.

A method for driving the LCD devices of the present invention which are structured as explained above will now be described with reference to FIG. 13.

Figure 13A:
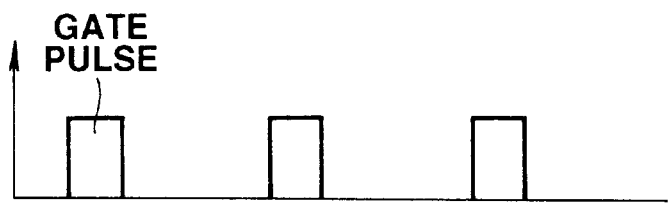
FIGS. 13A to 13C are timing charts for explaining the AFLC display device driving method of the present invention.
Figure 13B:
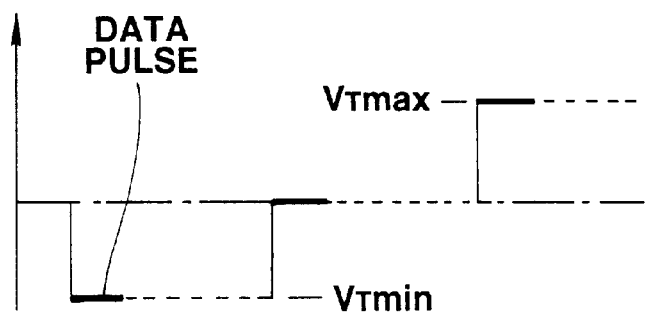
Figure 13C:
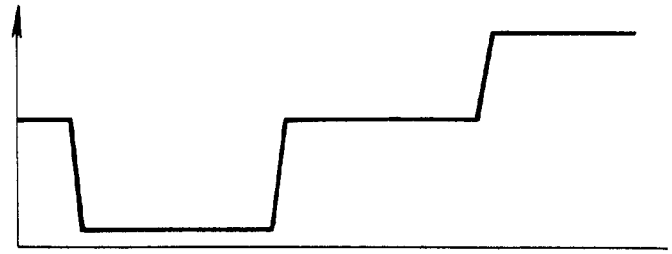

FIG. 13A shows a gate signal which the gate driver 31 applies to a gate line 15 in an arbitrary row, while FIG. 13B shows a data signal which the data driver 32 supplies to each data line 16 in synchronization with a gate pulse. The voltage of the data signal is set at such a value as would cause the LC layer 21 to exhibit no ferroelectric phase, i.e., at a voltage between VTmax and VTmin and corresponding to the transmittance to be attained. FIG. 13C shows variations in the transmittance which occur upon the application of data pulses shown in FIG. 13B.

Each gate signal becomes ON as a gate pulse in the selection period during which a corresponding row is selected. This gate pulse turns on the TFTs in the selected row. In the writing period during which the TFTs 14 are ON, the data signal corresponding to a display gradation is applied between the pixel electrodes 13 and the common electrode 17 facing the pixel electrodes 13. When the gate pulse becomes OFF, the TFTs 14 becomes OFF, and the voltage applied between the electrodes 13 and 17 until then is retained in pixel capacitors each being comprised of one electrode 13, the electrode 17 and the LC layer 21 sandwiched therebetween. As shown in FIG. 13C, the display gradation corresponding to the retained voltage is maintained until the selection period in which the next row is selected. Thus, according to this driving method, an image can be displayed at the desired gradation by controlling the voltage of a data pulse.

Figure 14:
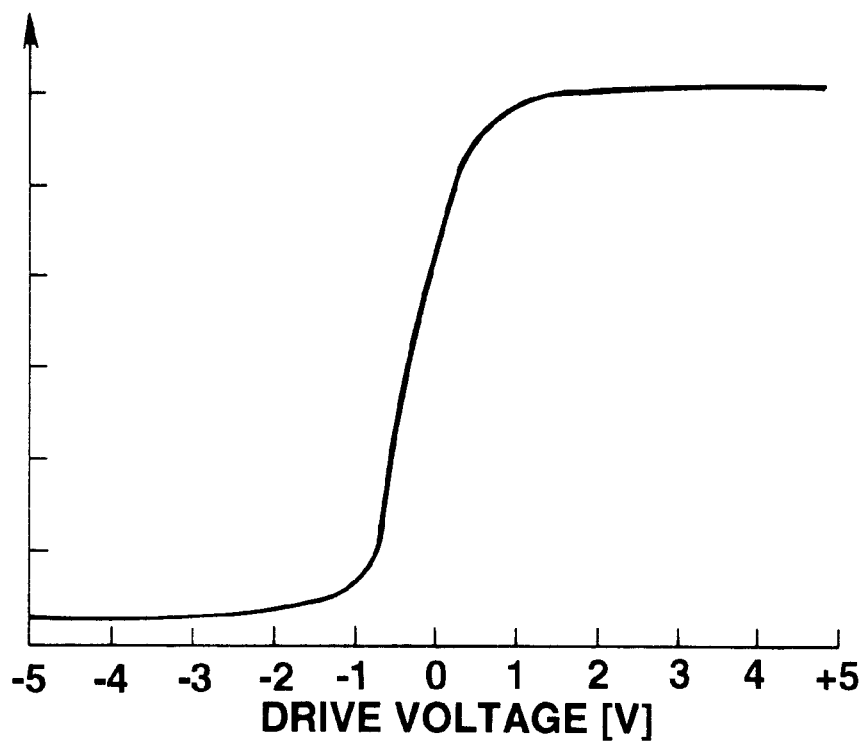
FIG. 14 is a diagram showing the relationship between the applied voltage and the transmittance when the liquid crystal display device of Example 2 (according to the present invention) is driven using the driving method shown in FIG. 13.

FIG. 14 shows variations in the transmittance when the LCD device of Example 2 according to the present invention is driven by the driving method shown in FIGS. 13A and 13B, and when the voltage of the data signal is increased sequentially from −5V to +5V and is lowered sequentially from +5V to −5V. It can be understood from FIG. 14 that an image can be reliably displayed at the desired gradation by employing the driving method shown in FIGS. 13A and 13B.

An example of the structure of the data driver 32, which makes such a drive possible, will now be described with reference to FIG. 15.

Figure 15:
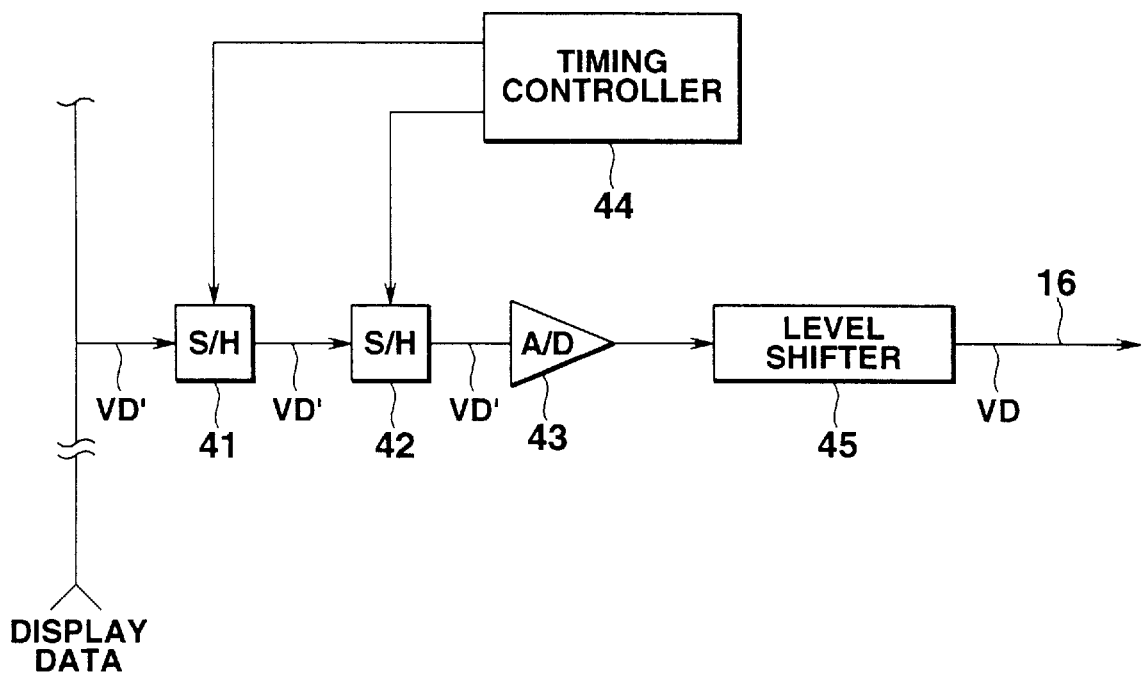
FIG. 15 is a block diagram exemplifying the structure of a driver circuit for accomplishing the driving method shown in FIG. 13.

As illustrated in FIG. 15, the data driver 32 includes a first sampling/holding circuit 41, a second sampling/holding circuit 42, an A/D (Analog/Digital) converter 43, a timing controller 44 and a level shifter 45.

The first sampling/holding circuit 41 samples/holds a signal component (one image data item) VD', for a corresponding pixel, of an externally supplied analog signal. The second sampling/holding circuit 42 samples/holds the signal VD' held by the first sampling/holding circuit 41.

The A/D converter 43 converts the signal held by the second sampling/holding circuit 42 to digital gradation data.

In each selection period, the timing controller 44 supplies timing control signals as sampling/holding instructions to the first and second sampling/holding circuits 41 and 42.

The level shifter 45 converts the digital gradation data, output from the A/D converter 43, to a data pulse having a corresponding voltage VD (a voltage for a driving system and which is required to display the gradation designated by the digital gradation data), and outputs the data pulse to a corresponding one of the data lines 16. The level shifter 45 separates a power supply unit for a signal processing system and that for the driving system from each other. The voltage VD output from the level shifter 45 is applied to the LC layer 21 in the writing period during which the TFTs 14 in a corresponding row are ON, and is retained between the electrodes 13 and 17 while the TFTs 14 are OFF.

The first sampling/holding circuit 41, the second sampling/holding circuit 42, the A/D converter 43 and the level shifters 45 are arranged per column of pixels, while the timing controller 44 is arranged in common to a plurality of columns of pixels.

The structure of the data driver 32 is not limited to that illustrated in FIG. 15. For example, a sampling/holding circuit included in the A/D converter 43 may be used as the second sampling/holding circuit 42. The data output from the A/D converter 43 may be processed in a specific way, after which the processed data may be supplied to the level shifter 45 so as to be converted to the voltage for the driving system. The processed data may be converted to a gradation signal having a voltage for the signal processing system, and thereafter may be supplied to the level shifter 45 so as to be converted to the voltage for the driving system.

A variety of timing signals can be supplied from the outside of the data driver 32. Further, image data itself may be digital data.

The present invention is not limited to the above-described embodiments, and various modifications and applications are available.

For example, the antiferroelectric liquid crystal of the present invention is not limited to one whose main component is a liquid crystal composition having the skeleton shown in Chemical Formula 1, and any other liquid crystal can be employed insofar it shows the phase in which the LC molecules within each smectic layer are aligned, whereas adjoining layers have no correlation with each other in the alignment of the LC molecules.

The properties of the liquid crystal are also not limited to those described previously. The material, thickness, etc. of the alignment films can also be changed when needed.

Any combination of the LC material and the alignment films can be employed as far as the above-described alignment of the LC molecules can be achieved.

The thickness of the LC layer 21 can also be arbitrarily determined as far as the above-described alignment of the LC molecules can be achieved. Even a liquid crystal, in a part of which the LC molecules are not aligned in the state explained previously, can also be employed insofar as the presence of such a part hardly influences display.

Moreover, according to the above-described embodiments, the polarization plates 23 and 24 are arranged so that their transmission axes 23A and 24A are perpendicular to each other. However, the polarization plates 23 and 24 can be arranged so that their transmission axes are parallel with each other. Further, the optical axes of the polarization plates may be absorption axes.

Furthermore, the present invention is not limited to an AFLC display device which adopts TFTs as active elements, and is applicable also to an AFLC display device which adopts MIMs as active elements.

Figure 16:
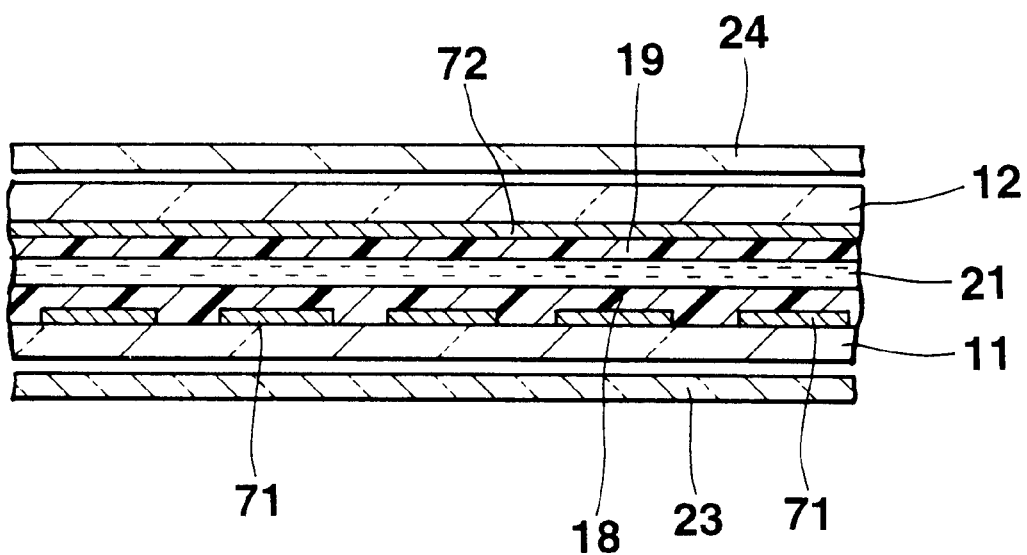
FIG. 16 is a diagram showing the structure of a simple matrix type liquid crystal display device.

The present invention is applicable also to a simple matrix (passive matrix) type display device in which scanning electrodes 71 and signal electrodes 72 perpendicular to the scanning electrodes 71 are arranged on the opposite surfaces of the substrates 11 and 12 facing each other, as illustrated in FIG. 16.

Although the LCD devices of the present invention employ an AFLC, they can continuously vary the display gradation in order to display an image at the desired gradation.

What is claimed is:

1. A liquid crystal display device comprising:
   a first substrate on which pixel electrodes and active elements connected to said pixel electrodes are arranged in a matrix pattern;
   a second substrate on which a common electrode is formed facing said pixel electrodes;
   a liquid crystal layer formed by sealing, between said first and second substrates, an antiferroelectric liquid crystal which exhibits a chiral smectic phase while said liquid crystal is in a bulk state; and
   alignment films arranged each on one of opposite surfaces of said first and second substrates and having aligning forces by which liquid crystal molecules are aligned in a state in which there is substantially no correlation in molecular order between adjoining smectic layers in said liquid crystal layer, and by which a director of said liquid crystal layer is set substantially coincident with a direction of a normal line of said smectic layers; and
   means for changing the director of said liquid crystal layer by applying a voltage between said pixel electrodes and said common electrode.

2. The liquid crystal display device according to claim 1, wherein the aligning forces which said alignment films have are stronger than intermolecular forces acting between said liquid crystal molecules.

3. The liquid crystal display device according to claim 2, wherein surface energy dispersion forces of said alignment films range from 30 to 50 dyn/cm, and van der Waals forces of said alignment films range from 3 to 20 dyn/cm.

4. The liquid crystal display device according to claim 3, wherein:
   said liquid crystal, while in the bulk state, exhibits a chiral smectic CA phase having a double helical structure;
   when said liquid crystal is sealed between said first and second substrates, said double helical structure breaks, the liquid crystal molecules are aligned in the state in which there is no correlation in molecular order between said smectic layers, and the director is set substantially coincident with the direction of the normal line of said smectic layers;
   the director of said liquid crystal layer changes in accordance with a polarity and magnitude of the applied voltage; and
   when a high voltage exceeding a predetermined value is applied to said liquid crystal layer, said liquid crystal layer exhibits a ferroelectric phase in accordance with a polarity of the applied high voltage.

5. The liquid crystal display device according to claim 1, wherein said means for changing the director includes driving means for controlling the director in order to perform gradation display, by applying a voltage to said liquid crystal layer in a manner of applying the voltage between each of said pixel electrodes and said common electrode through said active elements.

6. The liquid crystal display device according to claim 5, wherein a cone which a molecule in a chiral smectic CA phase traces has an axis and forms a cone angle with said axis, and said driving means moves the director of said liquid crystal layer along said cone through an angle smaller than a maximum value of said cone angle, thereby to perform the gradation display without setting said liquid crystal layer in a ferroelectric phase.

7. A liquid crystal display device comprising:

a first substrate on which first electrodes are formed;

a second substrate on which a second electrode is formed facing said first electrodes;

a liquid crystal layer formed by sealing, between said first and second substrates, an antiferroelectric liquid crystal which exhibits a chiral smectic phase while said liquid crystal is in a bulk state; and alignment films arranged each on one of opposite surfaces of said first and second substrates and having aligning forces by which liquid crystal molecules are aligned in a state in which there is no correlation in molecular order between adjoining smectic layers in said liquid crystal layer, and by which a director of said liquid crystal layer is set substantially coincident with a direction of a normal line of said smectic layers.

8. The liquid crystal display device according to claim 7, wherein the aligning forces which said alignment films have are stronger than intermolecular forces acting between the liquid crystal molecules.

9. The liquid crystal display device according to claim 7, further comprising driving means for controlling the director of said liquid crystal layer in order to perform gradation display, by applying a voltage to said liquid crystal layer.

10. The liquid crystal display device according to claim 9, wherein a cone which a molecule in a chiral smectic CA phase traces has an axis and forms a cone angle with said axis, and said driving means moves the director of said liquid crystal layer along said cone through an angle smaller than a maximum value of said cone angle, thereby to perform the gradation display without setting said liquid crystal layer in a ferroelectric phase.

11. A method for driving a liquid crystal display device, comprising steps of:

sealing, between first and second substrates, a liquid crystal layer formed of a liquid crystal material which exhibits a chiral smectic CA phase while said liquid crystal material is in a bulk state, liquid crystal molecules of said liquid crystal material being aligned in a state in which there is no correlation in molecular order between smectic layers in said liquid crystal layer and a director of said liquid crystal layer being set substantially coincident with a direction of a normal line of said smectic layers when said liquid crystal layer is sealed between said first and second substrates; and controlling the director of said liquid crystal layer in order to perform gradation display, by applying a voltage to said liquid crystal layer.

12. The method according to claim 11, wherein a cone which a molecule in a chiral smectic CA phase traces has an axis and forms a cone angle with said axis, and the director of said liquid crystal layer is moved along said cone through an angle smaller than a maximum value of said cone angle, thereby to perform the gradation display without setting said liquid crystal layer in a ferroelectric phase.

13. A method for displaying a gradation, comprising steps of:

forming a liquid crystal layer having a predetermined thickness by sealing, between first and second substrates, a liquid crystal material which exhibits a chiral smectic CA phase while said liquid crystal material is in a bulk state;

aligning liquid crystal molecules in a state in which there is no correlation in molecular order between adjoining smectic layers in said liquid crystal layer, and setting a director of said liquid crystal layer substantially coincident with a direction of a normal line of said smectic layers, through utilization of aligning forces of alignment films formed on inner surfaces of said first and second substrates;

controlling the director of said liquid crystal layer by applying a voltage to said liquid crystal layer; and displaying a gradation by detecting a change in the director with polarization means.

* * * * *